US006816084B2

(12) United States Patent
Stein

(10) Patent No.: US 6,816,084 B2
(45) Date of Patent: Nov. 9, 2004

(54) PROCESS AND DEVICE FOR DETECTING AND MONITORING A NUMBER OF PRECEDING VEHICLES

(75) Inventor: Fridtjof Stein, Ostfildern (DE)

(73) Assignee: DaimlerChrysler AG (DE)

( * ) Notice: Subject to any disclaimer, the term of this patent is extended or adjusted under 35 U.S.C. 154(b) by 162 days.

(21) Appl. No.: 09/788,856

(22) Filed: Feb. 20, 2001

(65) Prior Publication Data

US 2002/0021229 A1 Feb. 21, 2002

(30) Foreign Application Priority Data

Feb. 18, 2000 (DE) .......................................... 100 07 501

(51) Int. Cl.⁷ ................................................. G08G 1/16
(52) U.S. Cl. ...................... 340/903; 340/435; 340/436; 342/70
(58) Field of Search ................................. 340/903, 461, 340/435, 436, 539; 701/58, 79, 93, 96, 25; 342/70, 71

(56) References Cited

U.S. PATENT DOCUMENTS

| | | | | |
|---|---|---|---|---|
| 5,617,085 A | * | 4/1997 | Tsutsumi et al. | ........... 340/903 |
| 5,938,714 A | * | 8/1999 | Satonaka | ..................... 701/96 |
| 5,949,331 A | * | 9/1999 | Schfield et al. | ............. 340/461 |
| 5,959,572 A | * | 9/1999 | Higashimata et al. | ......... 342/70 |
| 6,134,497 A | * | 10/2000 | Hayashi et al. | ................ 701/70 |
| 6,151,539 A | * | 11/2000 | Bergholz et al. | .............. 701/25 |
| 6,191,704 B1 | * | 2/2001 | Takenaga et al. | ........... 340/903 |
| 6,230,093 B1 | * | 5/2001 | Michi et al. | ................... 701/96 |
| 6,259,359 B1 | * | 7/2001 | Fujinami et al. | ............ 340/435 |
| 6,292,737 B1 | * | 9/2001 | Higashimata et al. | ......... 701/96 |
| 6,327,536 B1 | * | 12/2001 | Tsuji et al. | .................. 701/301 |

* cited by examiner

Primary Examiner—Benjamin C. Lee
Assistant Examiner—Phung Nguyen
(74) Attorney, Agent, or Firm—Pendorf & Cutliff

(57) ABSTRACT

For substantial relieving the driver of a vehicle with respect to the monitoring of the preceding environment as well as the evaluation of distances and speeds of multiple preceding vehicles, there is provided in accordance with the invention a process for detecting and monitoring a number of vehicles (A through C) preceding one's own vehicle (E), which process divides the preceding environment into at least a near zone (ZII) and at least one distant zone (ZI), wherein for the preceding vehicles (A through C) respectively their lane (S1 through S3), speed ($V_A$ through $V_C$) and/or distance to the monitoring vehicle (E) are determined, and on the basis of the respective determined lane (S1 through S3), speed ($V_A$ through $V_C$) and/or distance for the preceding vehicles (A through C) their position with respect to the near zone (ZII) or the distant zone (ZI) are determined, wherein on the basis of the respective determined speeds ($V_A$ through $V_C$) and/or positions of the preceding vehicles (A through C) the actual speed ($V_{E\ actual}$) of the monitoring vehicle (E) is adjusted.

14 Claims, 4 Drawing Sheets

PROCESS AND DEVICE FOR DETECTING AND MONITORING A NUMBER OF PRECEDING VEHICLES

BACKGROUND THE INVENTION

1. Field of the Invention

The invention concerns a process and a device for detecting and monitoring a number of vehicles driving ahead of one's own vehicle.

2. Description of the Related Art

A process of this type serves for assisting the operator of a vehicle during lane change, for example for merging into or exiting from a highway or for passing a slower vehicle. Beyond this the process serves for conforming the speed of the own vehicle to the speed of one of the preceding vehicles in one's own lane.

This type of process is known for example from DE 43 13 568 C1. Therein for guidance assisting in a lane change the preceding space and the rearward space of the adjacent target lane is monitored for determining the distance of objects. The necessary safety distances are maintained, and corresponding lane change opportunities are recognized. As monitoring detectors there are known, in addition to ultrasound and infrared devices (see for example DE 38 32 720 A1), also radar devices for monitoring the so-called blind zone (see for example DE 39 02 852 A1) and for measuring the distance with respect to preceding vehicles to enable driving with automatic maintenance of distance or interval (see EP 0 501 345 A2).

The known processes always take into consideration a preceding vehicle in only a very narrow limited area, for example in the directly preceding area (=own lane) or in an adjacent area (=adjacent lane). In the case that this preceding vehicle leaves the monitored area, monitoring is no longer possible. In particular in cases such as multi-lane roadways, in which driving occurs at different speeds in the various lanes, a monitoring of all preceding vehicles is not possible.

SUMMARY OF THE INVENTION

The invention is thus concerned with the task of providing a process and device for monitoring a number of preceding vehicles, which substantially unburdens the vehicle operator of the task of monitoring the preceding environment as well as estimating distances and speeds.

The first mentioned task is inventively solved by a process for detecting and monitoring a number of vehicles preceding one's own vehicle, in which the surrounding environment is divided into at least one near zone and at least one distant zone, wherein the lane, speed and/or distance of the respective preceding vehicles is determined relative to the monitoring vehicle and, on the basis of the respective determined lane, speed and/or distance for the respective preceding vehicles, their positions with respect to the near zone or the distant zone is determined, and wherein the actual speed of the monitoring vehicle (=own speed) is adjusted on the basis of the respective determined speed and/or position of the preceding vehicles.

By monitoring the near zone with a broad aperture angle and the distant zone with narrower aperture angle, objects, in particular vehicles, are detected over the entire breadth of a roadway with multiple lanes and monitored with respect to their operating parameters, such as for example speed, distance and/or position, relative to the monitoring vehicle. Therein the respective positions of the preceding vehicles is preferably monitored on the basis of the associated angle of sight with respect to the longitudinal axis of the monitoring vehicle. For example, the angle of sight for the vehicles preceding the monitoring vehicle in the same lane is 0°. For preceding vehicles in adjacent lanes there is an angle of sight which is greater than 0°, and which depends also upon the distance to the monitoring vehicle, and from this information the position of the preceding vehicle is determined. The operator of the monitoring vehicle is thereby substantially relieved of the simultaneous monitoring of multiple vehicles and the burden of processing the flood of information associated therewith, that is, estimation of the various speeds and distances of multiple vehicles, as well how to adapt or conform the driving relationship of the monitoring vehicle thereto. In particular, the driver of the monitoring vehicle is in supported in a simple way and manner in the observation and judging of the preceding traffic situation. Besides this it becomes possible, by the detection of preceding vehicles in the near range zone in adjacent lanes, and by monitoring these vehicles according to the national regulations, to undertake a passing maneuver of these vehicles. That is, in countries in which passing on the left or the right side is forbidden, the speed of the vehicle is adapted depending upon the own position and the position of the preceding vehicle in such a manner, that when passing is forbidden the instantaneous (actual) speed is appropriately restricted. If however passing is allowed, then the actual speed is increased to the maximal permitted speed and the monitoring vehicle accelerates for passing.

In given cases the change in lanes of a preceding vehicle is detected. Preferably, the actual speed of the monitoring vehicle is accelerated or decelerated depending upon the lane change of the preceding vehicle. By the detection of the lane change of a preceding vehicle as well as the further monitoring of this vehicle, a mistake in passing of this vehicle is prevented.

The second above mentioned task is inventively solved by a device for detecting and monitoring a number of vehicles driving in advance of the monitoring vehicle including a first sensor with a first aperture angle or sweep for detecting preceding vehicles in the near range zone, and a second sensor with a second aperture angle or sweep for detecting preceding vehicles in a far range zone, wherein the first aperture angle is larger than the second aperture angle, and with an assisting unit for conforming the actual speed and/or the actual distance of the own vehicle on the basis of the position and/or speed of the preceding vehicles.

Preferably, the first aperture angle covers an area of from 20° to 180°. Thereby in particular every vehicle can be detected, which in the case of a multi-lane road is in the immediate neighborhood on adjacent lanes. Therewith the driving condition of the monitoring vehicle can be adapted to the overall preceding vehicle situation. In particular in the case of a traffic jam in a multi-lane roadway, in which at least two preceding vehicles are detected and monitored in the near zone, the vehicle operator is relieved in a particularly advantageous and simple manner of the task of monitoring and judging the complex advanced vehicle situation.

Preferably, the second aperture angle covers an area of from 3° to 30°. This makes it possible, at high speeds of the monitoring vehicle, to monitor the preceding environment with the greatest possible range. More particularly, the monitoring of the immediately preceding environment, that is, the vehicle lane of the monitoring vehicle, up to the range of approximately 200 meters is made possible. Preferably, as the second sensor, a wide angle sensor, a radar unit, an optical camera or a laser scanner is provided. As first sensor a long range radar is preferably provided.

The advantages achieved in accordance with the invention are comprised in particular therein, that by a combination of the monitoring of near and distant zones with wider or as the case may be narrower aperture angles, a lateral detection of preceding vehicles is made possible. Therewith preceding vehicles, both in the left as well as in the right lane, can be detected simultaneously and discriminated from each other. Therewith the overall preceding traffic situation is monitored and the monitoring vehicle relationship is appropriately conformed. The operator of the monitoring vehicle is thereby substantially unburdened. Beyond this, the vehicle operator is supplementally or alternatively signaled of a possible dangerous or hazardous situation by an acoustic and/or optical signal or some other indication. It is further possible that, by means of the process, while driving on multi-lane roads when passing is permitted only on the left or on the right or on both sides, the legal and optimal lane for passing at any instant is indicated. Alternatively an unpermitted passing is prevented by braking of the monitoring vehicle.

BRIEF DESCRIPTION OF THE DRAWINGS

Illustrative embodiments of the invention are shown in greater detail on the basis of the drawings. There is shown.

The same reference numbers are used for the corresponding parts in all figures.

DETAILED DESCRIPTION OF THE INVENTION

Figure 1:
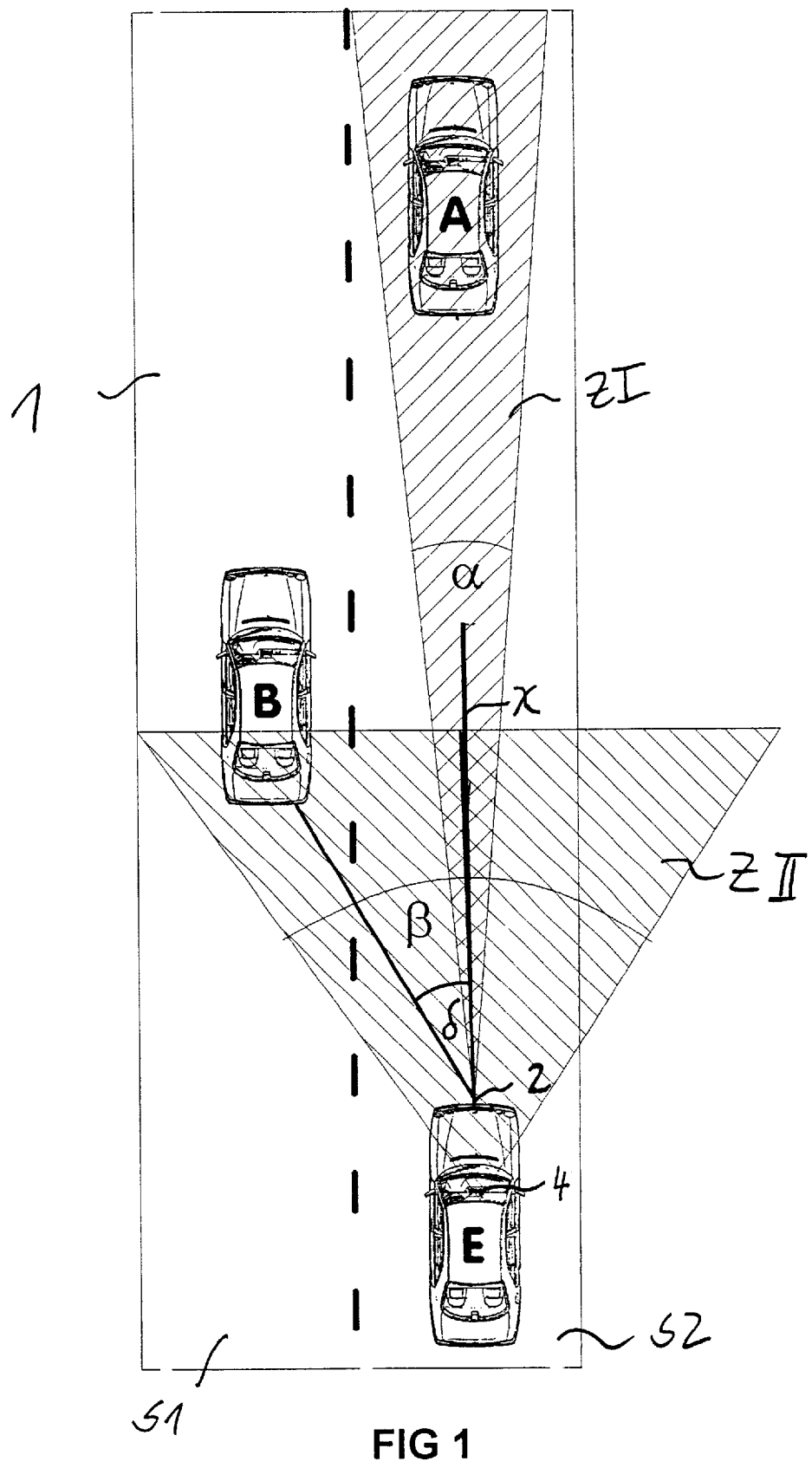
FIG. 1 schematic view of a road with multiple lanes and with close and distant zones, FIG. 2 schematic view of an alternative road according to FIG. 1, FIG. 3 schematic view of an alternative road according to FIG. 1, and FIG. 4 schematic diagram of the view looking forward out of the monitoring vehicle according to FIG. 3.

FIG. 1 shows a schematic view of a road 1 with multiple lanes S1 through S2. The monitoring vehicle E is driving in lane S2 with an actual speed $V_{E\ actual}$, which corresponds to a preset intended speed $V_{E\ intended}$ which has been preset into an assisting device, the vehicle E driving behind a lead vehicle A which has a speed $V_A$. The lane S2 is thus the actual lane of the monitoring vehicle E. As assisting unit there is provided for example a "Tempomat" or cruise control, for automatic driving of the monitoring vehicle E with maintenance of an appropriate safety interval.

By means of a first sensor 2 which is provided for example in the radiator grill of the first vehicle E, monitoring of preceding vehicles A occurs in the preceding driving area in a distant zone ZI. For monitoring the distant zone ZI a long range radar with a first narrow aperture angle a with an angle of approximate 3° to 30° is provided as first sensor 2. The first sensor 2 is characterized by a particularly long range and a narrow aperture angle α for employment in high speed situations, in order in particular to monitor the actual lane (=lane S2) of the monitoring vehicle E for preceding vehicles A. Therein there is detected, by means of the first sensor 2, the speed $V_A$ of the preceding vehicle A and/or the distance from the monitoring vehicle E to the preceding vehicle A.

By means of a second sensor 4 provided, for example, in the front area, in particular the front windshield area or in the internal mirror area of the monitoring vehicle E, a near zone ZII in the preceding driving area is monitored for any preceding vehicles B. For monitoring the near zone ZII a wide-angle sensor, namely a radar unit or an optical camera or a laser scanner with a wide-as-possible second aperture angle in the range of approximately 20° to 180° is provided as second sensor 4. The second sensor 4, due to its broad aperture angle β and its short range, is particularly suitable for employment for low speeds, in order in particular to monitor both the actual lane (=lane S2) of the monitoring vehicle E as well also the adjacent lanes S1 for preceding vehicles B. Thereby, by means of the second sensor 4, the speed $V_B$ of the preceding vehicle B and/or the distance of the monitoring vehicle E to the preceding vehicle B is detected.

Alternatively, or in addition, the respective position of the preceding vehicles A through B is/are determined on the basis of an associated angle of sight χ or as the case may be δ in relation to the longitudinal axis of the own vehicle E. The angle of sight χ of the vehicle A preceding in the actual lane S2 corresponds to 0° and is determined by means of a first sensor 2. The angle of sight δ of the vehicle B preceding on the lane S1 adjacent to that of the monitoring vehicle E is greater than 0° and is determined by means of a second sensor 4.

While driving, the actual speed $V_{E\ actual}$ of one's own vehicle E can be greater than the speed $V_A$ of the preceding vehicle A in the distant zone ZI. The assistant unit then regulates the actual speed $V_{E\ actual}$ of the own vehicle E by means of the intended speed value $V_{E\ intended}$ in such a manner that $V_{E\ actual}=V_A$. As soon as vehicle A changes lane, the first sensor 2 loses the target (=vehicle A), however the second sensor 4 continues to detect the preceding vehicle B. By means of the assisting unit a passing on the right could be prevented in that the actual speed $V_{E\ actual}$ is adjusted in such a manner, that $V_{E\ actual}=V_B$. In the case that in this country passing on the right is permitted, the actual speed $V_{E\ actual}$ is increased via the intended speed $V_{E\ intended}$, so that one's own vehicle E passes the vehicle B.

Figure 2:
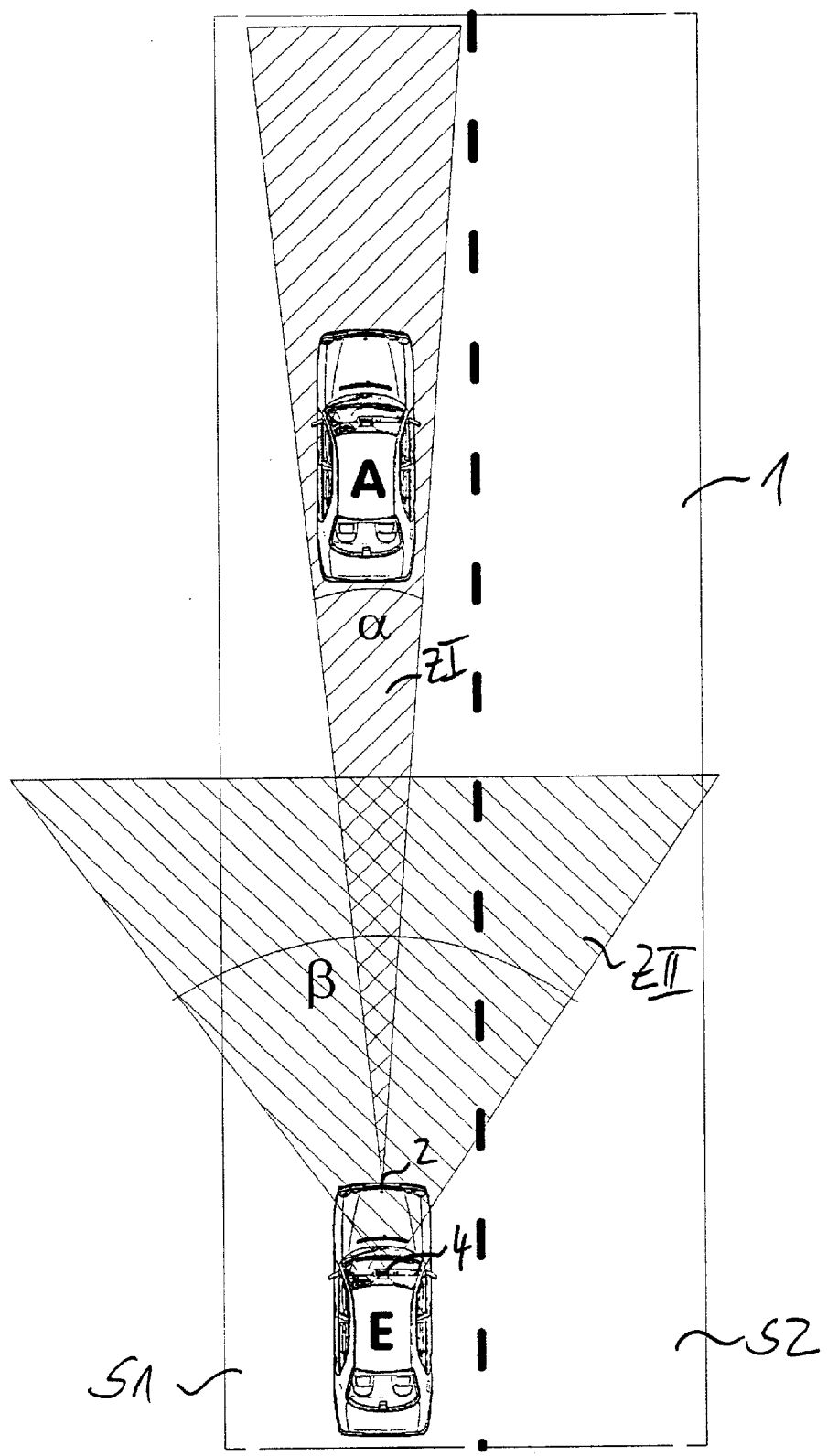

FIG. 2 shows schematically an alternative road 1 with multiple lanes S1 through S2. By means of the first sensor 2 the preceding vehicle A is monitored in the distant zone ZI and the speed $V_A$ thereof, the position and/or the distance from the monitoring vehicle E is determined. By means of the second sensor 4 no additional vehicle is detected in the near zone ZII. Depending upon setting type and design of the assistant unit a passing on the right is allowed or forbidden.

Figure 3:
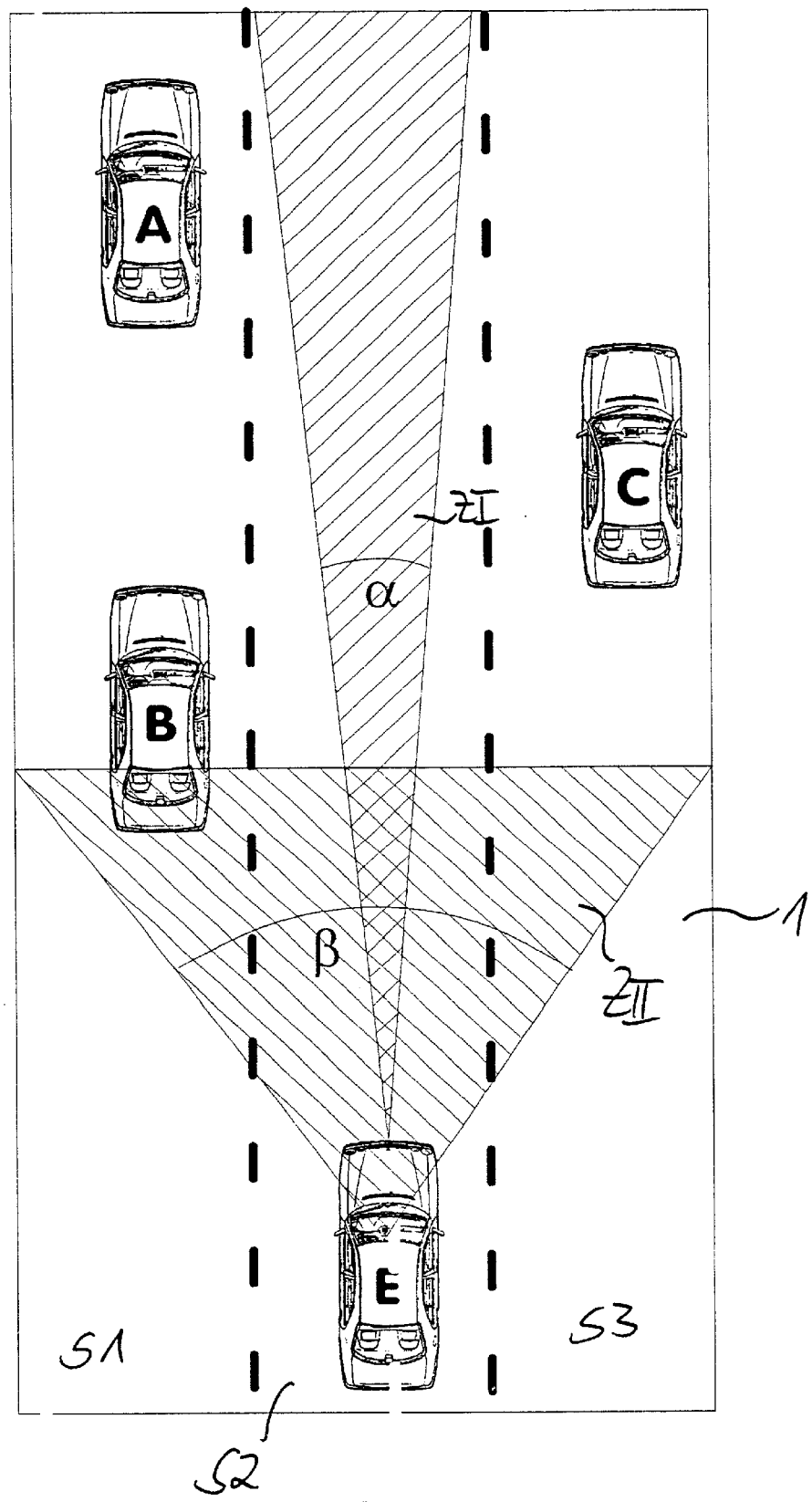

FIG. 3 shows a further alternative road 1 with multiple lanes S1 through S3. Therein sensor 4 monitors objects laterally in the preceding driving area, that is, by means of the second sensor 4 the near zone ZII is monitored with a largest possible aperture angle β, which monitors all of lanes S1 through S3 with a short range and over the entire breadth simultaneously. On the actual lane S2 no vehicle is detected either by the first sensor 2 nor by the second sensor 4. By means of the second sensor 4 there is on the lane S1 adjacent to the occupied lane S2 the vehicle B detected in the near zone ZII with the speed $V_B$, the position, and/or the distance to the monitoring vehicle.

For a lane change of the monitoring vehicle E to the lane S3, the vehicle C and it speed $V_C$, the position and/or the distance to the monitoring vehicle E is detected in the distant zone ZI using the first sensor 2. Further, the vehicle B is detected in the near zone ZII by the second sensor 4. Depending upon the type and programming as well as the settings of the assisting unit, the monitoring vehicle E is adjusted on the basis of the determined positions of the preceding vehicles A through C, their determined speed $V_A$ through $V_C$ and/or their determined distance from the monitoring vehicle E in respect to the monitoring vehicle actual speed $V_{E\ actual}$ and/or the monitoring vehicle actual distance to the immediately preceding vehicle A through C. That is, the actual speed $V_{E\ actual}$ of the monitoring vehcile E is accelerated or decelerated accordingly.

Figure 4:
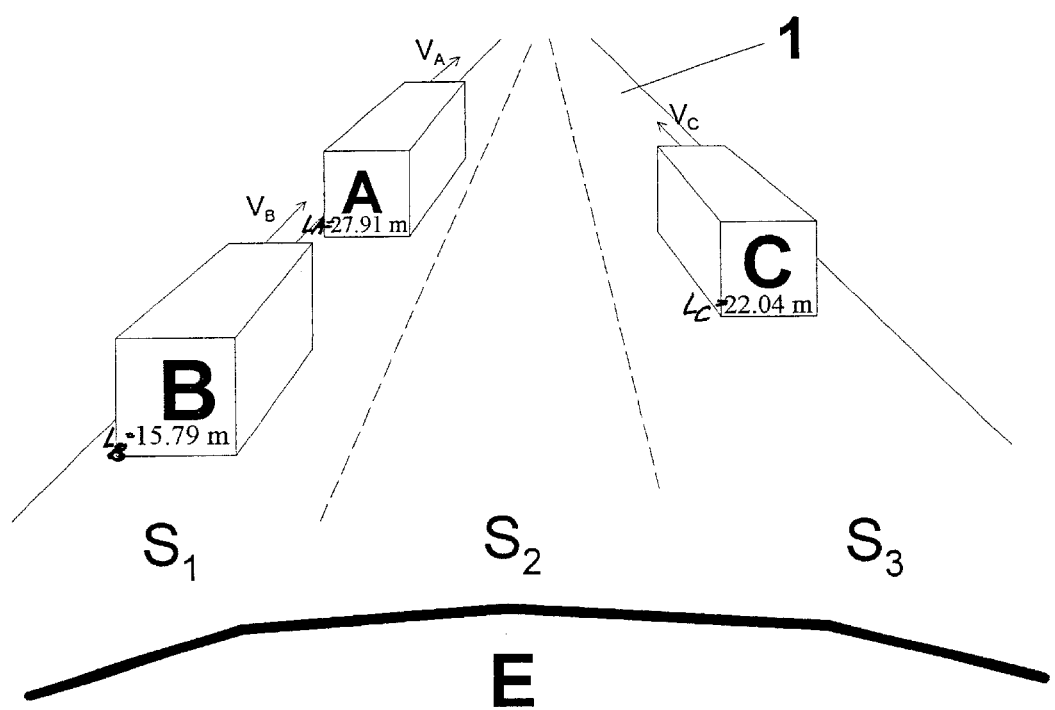

FIG. 4 shows the view of the operator of the monitoring vehicle E which corresponds to the traffic situation according to FIG. 3. Depending upon type and design of the output devices, for example a display, the preceding vehicles A through C are shown in their associated positions on the appropriate lanes S1 through S3 with indications for the respective associated distances $L_A$ through $L_C$ and/or for the respective speeds $V_A$ through $V_C$. Preferably this information is fed directly to the assisting unit for adjusting the appropriate actual speed $V_{E\ actual}$ of the monitoring vehicle E without this information being supplied to the monitoring vehicle operator.

The herein described process as well as the therein employed device, including a combination of sensors 2 and 4 serving varying functions, makes possible a continuous and in particular lateral monitoring of the preceding driving situation over the entire road width.

What is claimed is:

1. A process for detecting and monitoring a number of vehicles (A through C) preceding a monitoring vehicle (E), comprising:
    subdividing the environment preceding the monitoring vehicle into at least one near zone (ZII) and at least one distant zone (ZI),
    determining for the preceding vehicles (A through C) respectively the lane (S1 through S3), speed ($V_A$ through $V_C$) and distance from the monitoring vehicle (E),
    determining on the basis of the respectively determined lane (S1 through S3), speed ($V_A$ through $V_C$) and distance information for the preceding vehicles (A through C) their positions with respect to the near zone (ZII) or the distant zone (ZI), and
    adjusting the actual speed ($V_{E\ actual}$) of the monitoring vehicle (E) on the basis of the respectively determined speed ($V_A$ through $V_C$) and position of the preceding vehicles (A through C).

2. A process according to claim 1, further comprising detecting a lane change of one of the preceding vehicles (S1 through S3).

3. A process according to claim 2, wherein said adjustment of the actual speed ($V_{E\ actual}$) of the monitoring vehicle (E) comprises accelerating or decelerating in response to a lane change of the one of the preceding vehicles (A through C).

4. A device for detecting and monitoring a number of vehicles (A through C) preceding a monitoring vehicle (E) including
    a first sensor (2) with a first aperture angle ($\alpha$) for detecting preceding vehicles (A through C) in a distant zone (ZI) and
    a second sensor (4) with a second aperture angle ($\beta$) for detecting preceding vehicles (A through C) in a near zone (ZII),
    wherein the second aperture angle ($\beta$) is larger than the first view angle ($\alpha$) and
    the device further including an assistant unit for adjusting the actual speed ($V_{E\ actual}$) and actual distance of the monitoring vehicle (E) on the basis of the detected position and speed ($V_A$ through $V_C$) of the preceding vehicles (A through C).

5. A device according to claim 4, wherein the second aperture angle ($\beta$) covers a range of from 20° to 180°.

6. A device according to claim 4, wherein the first aperture angle ($\alpha$) covers a range of from 3° through 30°.

7. A device according to claim 4, in which the second sensor (4) is a wide angle sensor, in radar unit, an optical camera or a laser scanner.

8. A device according to claim 4, wherein the first sensor (2) is a long range radar.

9. A process for detecting and monitoring a number of vehicles (A through C) preceding a monitoring vehicle (E), comprising
    subdividing the environment preceding the monitoring into at least one near zone (ZII) and at least one distant zone (ZI),
    detecting preceding vehicles (A through C) in the distant zone (ZI) by a first sensor (2) with a first aperture angle ($\alpha$) and detecting preceding vehicles (A through C) in the near zone (ZII) by a second sensor (4) with a second aperture angle ($\beta$),
    determining for the preceding vehicles (A through C) respectively the lane (S1 through S3), speed ($V_A$ through $V_C$) and distance from the monitoring vehicle (E),
    determining, on the basis of the respectively determined lane (S1 through S3), speed ($V_A$ through $V_C$) and distance information for the preceding vehicles (A through C), their positions with respect to the near zone (ZII) or the distant zone (ZI), and
    adjusting the actual speed ($V_{E\ actual}$) of the monitoring vehicle (E) on the basis of the respectively determined speed ($V_A$ through $V_C$) and position of the preceding vehicles (A through C).

10. A process according to claim 9, comprising detecting a lane change of one of the preceding vehicles (S1 through S3).

11. A process according to claim 10, wherein the actual speed ($V_{E\ actual}$) of the monitoring vehicle (E) is accelerated or decelerated in response to a lane change of the one of the preceding vehicles (A through C).

12. A process as in claim 1, wherein said process is completed on the basis of not more than two forward-looking sensors.

13. A device as in claim 4, wherein said device comprises not more than two forward-looking sensors.

14. A process as in claim 9, wherein said process is completed on the basis of not more than two forward-looking sensors.

* * * * *